United States Patent
Davi et al.

(10) Patent No.: US 10,189,593 B2
(45) Date of Patent: Jan. 29, 2019

(54) MACHINE AND METHOD FOR PACKAGING ARTICLES

(71) Applicant: CT PACK S.r.l., Valsamoggia (Bologna) (IT)

(72) Inventors: Daniele Davi, Ferrara (IT); Marco Pocaterra, Ferrara (IT)

(73) Assignee: CT PACK S.R.L., Valsamoggia (IT)

( * ) Notice: Subject to any disclaimer, the term of this patent is extended or adjusted under 35 U.S.C. 154(b) by 602 days.

(21) Appl. No.: 14/497,458

(22) Filed: Sep. 26, 2014

(65) Prior Publication Data

US 2015/0089904 A1 Apr. 2, 2015

(30) Foreign Application Priority Data

Sep. 27, 2013 (IT) .............................. BO2013A0534

(51) Int. Cl.
*B29C 65/18* (2006.01)
*B65B 9/067* (2012.01)
(Continued)

(52) U.S. Cl.
CPC .............. *B65B 59/02* (2013.01); *B29C 65/18* (2013.01); *B29C 66/1122* (2013.01);
(Continued)

(58) Field of Classification Search
CPC ............ B29C 66/4312; B29C 66/8225; B29C 66/92611; B29C 66/84123; B29C 66/849; B65B 9/067; B65B 51/303
(Continued)

(56) References Cited

U.S. PATENT DOCUMENTS 2,338,379 A * 1/1944 Henke ..................... B64C 13/00
244/113
2,858,709 A * 11/1958 McGurk ................. F16H 51/02
74/519
(Continued)

FOREIGN PATENT DOCUMENTS

EP 2436606 4/2012
WO 97/38905 10/1997
(Continued)

OTHER PUBLICATIONS

Italian Search Report dated May 6, 2014 from counterpart App No. IT BO20130534.

*Primary Examiner* — Thanh Truong
*Assistant Examiner* — Patrick Fry
(74) *Attorney, Agent, or Firm* — Shuttleworth & Ingersoll, PLC; Timothy J. Klima

(57) ABSTRACT

A machine for packaging articles includes a frame; a feeder feeding film to a packaging station to wrap articles. A sealing unit includes at least two sealing elements movable relative to each other between a spaced-apart position and a close-together position where the two sealing elements cooperate to seal the film interposed between them. First and second mechanisms having first and second motors move the sealing unit. The second motor is operatively coupled to at least one of the two sealing elements. The first and/or the second mechanisms include at least one articulated arm, respectively. A control unit is operatively connected to the first motor and to the second motor to drive them in proper relationship to move the two sealing elements relative to each other and relative to the frame according to a predetermined law of motion.

8 Claims, 5 Drawing Sheets

(51) Int. Cl.
*B65B 51/30* (2006.01)
*B65B 57/10* (2006.01)
*B65B 59/00* (2006.01)
*B65B 59/02* (2006.01)
*B65B 65/02* (2006.01)
*B29C 65/00* (2006.01)

(52) U.S. Cl.
CPC .... *B29C 66/4312* (2013.01); *B29C 66/73921* (2013.01); *B29C 66/81419* (2013.01); *B29C 66/8221* (2013.01); *B29C 66/8225* (2013.01); *B29C 66/83543* (2013.01); *B29C 66/849* (2013.01); *B65B 9/067* (2013.01); *B65B 51/303* (2013.01); *B65B 57/10* (2013.01); *B65B 59/00* (2013.01); *B65B 65/02* (2013.01)

(58) Field of Classification Search
USPC .................................. 53/450, 374.6
See application file for complete search history.

(56) References Cited

U.S. PATENT DOCUMENTS

| | | | | | |
|---|---|---|---|---|---|
| 3,816,969 | A | * | 6/1974 | Zimmerman | B65B 11/22 53/210 |
| 4,019,307 | A | * | 4/1977 | Ballestrazzi | B29C 66/8225 53/553 |
| 4,063,400 | A | * | 12/1977 | Millevoi | B65B 51/30 53/548 |
| 4,313,781 | A | * | 2/1982 | Rovigo | B26F 3/06 156/269 |
| 4,553,377 | A | * | 11/1985 | Klinkel | B29C 65/02 156/553 |
| 4,558,266 | A | * | 12/1985 | Sasaki | B23Q 15/0075 318/571 |
| 4,622,798 | A | * | 11/1986 | Oki | B29C 66/8221 156/583.1 |
| 4,903,460 | A | * | 2/1990 | Ballestrazzi | B29C 65/02 156/512 |
| 5,170,609 | A | * | 12/1992 | Bullock | B29C 65/18 53/434 |
| 5,267,478 | A | * | 12/1993 | Stridsberg | B23B 5/385 318/593 |
| 5,271,210 | A | * | 12/1993 | Tolson | B65B 61/28 198/343.1 |
| 5,329,745 | A | * | 7/1994 | Suga | B65B 9/067 53/450 |
| 5,653,085 | A | | 8/1997 | Suga | |
| 5,689,942 | A | * | 11/1997 | Suga | B65B 9/067 53/374.6 |
| 5,690,567 | A | * | 11/1997 | DeNijs | F16H 19/06 198/750.1 |
| 6,374,580 | B1 | * | 4/2002 | Kujubu | B65B 31/022 53/376.2 |
| 6,662,527 | B1 | * | 12/2003 | Suga | B29C 65/18 53/374.3 |
| 7,412,810 | B2 | * | 8/2008 | Konishi | B65B 7/164 53/329.4 |
| 8,539,741 | B2 | * | 9/2013 | Lubezny | B29C 65/02 53/451 |
| 2007/0227102 | A1 | * | 10/2007 | Prataiola | B29C 65/02 53/479 |

FOREIGN PATENT DOCUMENTS

WO 2006/003634 1/2006
WO 2010/109426 9/2010

* cited by examiner

MACHINE AND METHOD FOR PACKAGING ARTICLES

This application claims priority to Italian Patent Application BO2013A000534 filed Sep. 27, 2013, the entirety of which is incorporated by reference herein.

BACKGROUND OF THE INVENTION

This invention relates to a machine and a method for packaging articles, in particular a "flow packing" machine.

In the technical sector concerned, flow packing machines are known which comprise a sealing unit, or sealing head, designed to seal an article wrapped in a film of packaging material.

The sealing head is equipped with a pair of sealing elements which are movable relative to each other to seal the film around the product.

Usually, these machines comprise a first drive motor to move the sealing head and a second drive motor to move the sealing elements relative to each other.

In a first type of machine, the first and second drive motors are associated with, or mounted on, the sealing head.

That means the weight of the sealing head is increased.

One disadvantage of machines of this type, therefore, is that the sealing head is very heavy, creating particularly high inertia loads which prevent the machine from reaching high speeds and limiting machine operation.

To overcome these drawbacks, constructional solutions have been proposed which involve fixing the first and second motors to the machine frame.

One example of such a solution is known from patent document WO97/38905 which describes a packaging machine in which the drive motors of the sealing head and sealing elements, respectively, are both fixed to the frame.

This constructional solution, however, is particularly complicated because it involves providing a plurality of gearboxes to transmit motion from the motor (fixed to the frame) to the sealing elements.

In actual fact, therefore, this machine is highly complicated and relatively unreliable in operation because drive is transmitted from the motor to the sealing elements through a plurality of parts.

Moreover, this machine does not allow reaching high operating speeds because the inertias in play, inevitably due to reversal of motor drive direction and to the kinematic structure of the transmission means, are particularly high.

Further, the machine is relatively inflexible and requires very long times for adjustment and changeover.

SUMMARY OF THE INVENTION

This invention therefore has for an aim to overcome the above mentioned drawbacks.

In particular, the aim of this invention is to provide a packaging machine and method which overcome the above mentioned drawbacks.

More in detail, the aim of this invention is to provide a packaging machine and a packaging method which are particularly simple and reliable.

Another aim of the invention is to provide a packaging machine and a packaging method which allow reaching high operating speeds.

A yet further aim of the invention is to provide a packaging machine and a packaging method where the sealing pressure can be adjusted particularly easily.

Yet another aim of the invention is to provide a packaging machine and a packaging method which can be adapted very easily to different product types and sizes.

These aims are achieved by a packaging machine and a packaging method which comprises technical features as set forth in the present disclosure.

More specifically, the above aims are achieved by a machine for packaging articles, comprising:

a frame;

means for feeding a film to a packaging station, where the film is used to wrap the articles;

a conveyor line by which the articles are directed to the packaging station;

a sealing unit, located in the packaging station, movable relative to the frame and also comprising at least two sealing elements movable relative to each other between a spaced-apart position and a close-together position where the two sealing elements cooperate to seal the film interposed between them;

first movement means for moving the sealing unit and comprising a first motor mounted on the frame;

second movement means for moving the sealing unit, comprising a second motor mounted on the frame and operatively coupled to at least one of the two sealing elements, the machine being characterized in that the first and/or the second movement means comprise at least one articulated arm, respectively, and in that it comprises a control unit operatively connected to the first motor and to the second motor in order to drive them in proper relationship so as to move the two sealing elements relative to each other and relative to the frame according to a predetermined law of motion.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred non-limiting example embodiment of the invention and in which:

DESCRIPTION OF THE PREFERRED EMBODIMENTS

Figure 1:
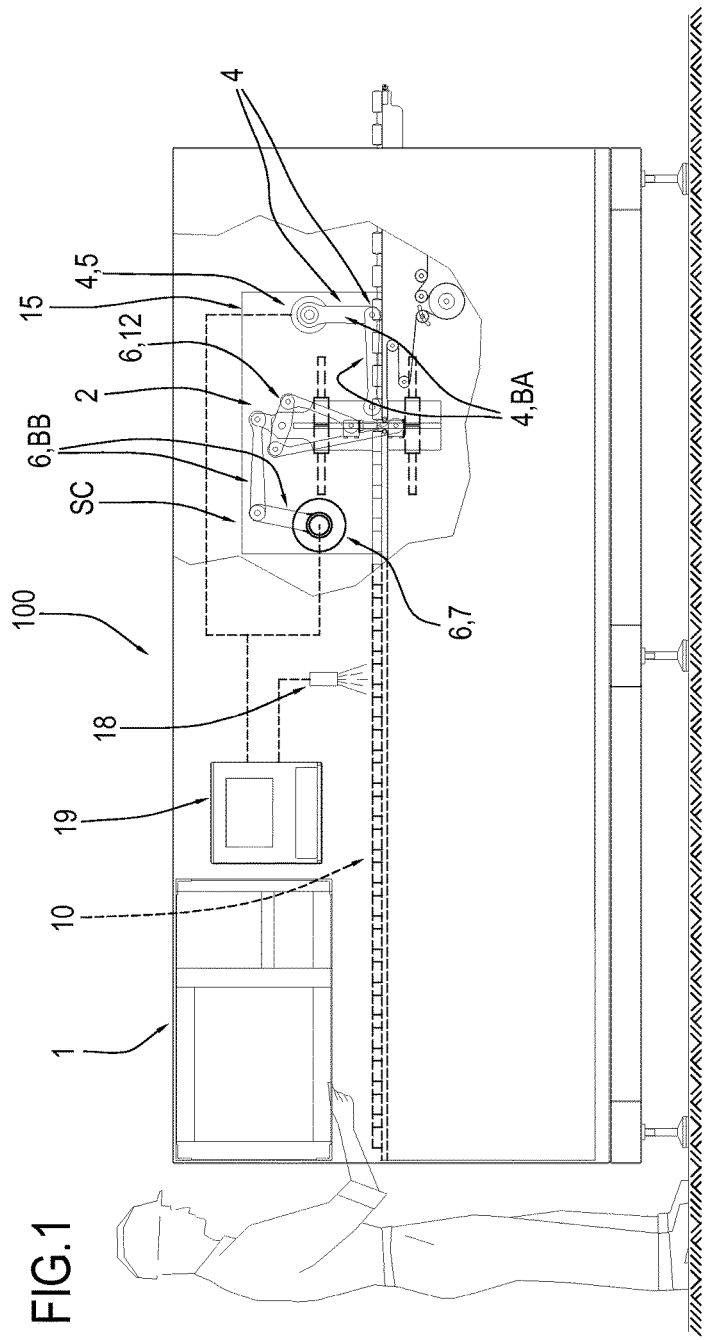
FIG. 1 is a side view of a packaging machine forming the object of this invention.

With reference to the accompanying drawings, the numeral 100 denotes a packaging machine forming the object of this invention.

The machine 100 for packaging articles A is a "flow packing" machine, that is to say, a machine designed to wrap articles in a film of thermoplastic material.

The machine 100 comprises a frame 1.

The machine 100 also comprises means for feeding a film to a packaging station SC, where the film is used to wrap the articles A.

These feed means preferably comprise one or more rollers defining a film unwinding path.

The feed means are designed to convey the film to the packaging station SC.

The machine 100 further comprises a conveyor line 10 by which the articles A are directed to the packaging station SC.

The conveyor line 10 comprises, preferably, one or more conveyors.

The machine 100 further comprises a sealing unit 2 located in the packaging station SC and movable relative to the frame 1 along at least one predetermined direction (of product feed).

According to the invention, the machine 100 (and, more specifically, the sealing unit 2) comprises at least two sealing elements (3A,3B).

The sealing elements (3A,3B) are movable relative to each other between a spaced-apart position and a close-together position where they cooperate to seal the film.

Preferably, the sealing elements (3A,3B) are movable relative to each other along a direction (vertical) at right angles to the feed direction of the articles A (horizontal).

It should be noted that at the close-together position, the sealing elements (3A,3B) exchange sealing force with each other and the film is interposed between the sealing elements so as to be thermosealed.

Thus, one of the two sealing elements (3A,3B) comes into contact with the top face of the film whilst the other of the two sealing elements (3A,3B) comes into contact with the underside face of the film.

Preferably, the sealing elements (3A,3B) are heated, so as to thermoseal the film.

Thus, according to this aspect, the machine 100 comprises means for heating the sealing elements (3A,3B).

Also according to the invention, the machine 100 comprises first movement means 4 for moving the sealing unit 2 and comprising a first motor 5 mounted on the frame 1.

In a preferred embodiment, the first motor 5 is connected (fixed) to the frame 1.

Preferably, the first motor 5 is an electric motor. Still more preferably, the first motor is a brushless motor.

The first movement means 4 move the sealing unit 2 relative to the frame 1, as explained in more detail below.

Also according to the invention, the machine 100 comprises second movement means 6 for moving the sealing unit 2 and comprising a second motor 7 mounted on the frame 1.

In a preferred embodiment, the second motor 7 is connected (fixed) to the frame 1.

Preferably, the second motor 7 is an electric motor. Still more preferably, the second motor 7 is a brushless motor.

The second movement means 6, in combination with the first movement means 4, move the two sealing elements (3A,3B) relative to each other, as explained in more detail below.

With reference to the first and second movement means (4,6), it should be noted that according to the invention, the first and/or the second movement means (4,6) comprise at least one articulated arm (BA,BB) having a first member (EA1,EB1) and a second member (EA2,EB2) which are movable relative to each other (in a movement plane) in order to move the sealing unit 2 and/or to move the two sealing elements (3A,3B) relative to each other, respectively.

It should be noted that the movement plane is a substantially vertical plane.

Preferably, the movement plane is at right angles to the conveying plane (horizontal) of the articles A, /defined by the feed line 10.

More specifically, according to a first aspect, the first movement means 4 comprise an articulated arm BA having a first member EA1 and a second member EA2 which are movable relative to each other (in a movement plane) in order to move the movable frame 9 (relative to the frame 1), respectively.

According to a second aspect, the second movement means 6 comprise at least one articulated arm BB having a first member EB1 and a second member EB2 which are movable relative to each other (in a movement plane) in order to move the two sealing elements (3A,3B) relative to each other.

Preferably, therefore, the machine 100 comprises a pair of articulated arms (BA,BB), namely a first articulated arm BA and a second articulated arm BB.

Thus, it should be noted that preferably, (as illustrated), both the first and the second movement means (4,6) comprise a respective articulated arm (BA,BB): the articulated arm BA of the first movement means 4 is connected (kinematically) to a movable frame 9, whilst the articulated arm BB of the second movement means 6 is connected (kinematically) to at least one of the two sealing elements (3A,3B).

The aspect described above is illustrated in the accompanying drawings, where each of the first and second movement means (4,6) comprises a respective articulated arm (BA,BB).

Below is a detailed description of the packaging station SC.

According to one aspect, the machine 100 comprises a movable frame 9 (configured to be movable relative to the fixed frame 1), which supports the sealing unit 2.

Preferably, the movable frame 9 is movable along a feed direction of the articles A.

According to this aspect, the first member EA1 of the articulated arm BA of the first movement means 4 is connected to the first motor 5 to be carried in rotation and the second member EA2 of the first movement means 4 is connected (hinged) to the movable frame 9.

More specifically, according to this aspect, the first member EA1 of the articulated arm BA of the first movement means 4 is fixed to a shaft which is driven in rotation by the first motor 5 so as to be carried in rotation by the first motor 5.

The second member EA2 of the first movement means 4, on the other hand, is connected (hinged) to the movable frame 9.

Preferably, the machine 100 comprises at least one guide 17 for the movable frame 9.

The guide 17 is configured to guide the movable frame 9 relative to the frame 1 along the direction of movement of the movable frame 9 (that is, along the feed direction of the articles A).

Preferably, the guide 17 is configured to guide the movable frame 9 along a predetermined direction (straight) of product feed.

Described below is the structure of the second movement means 6.

According to another aspect, the sealing unit 2 comprises at least one guide 11 to guide the movement of the first and second sealing elements 3A and 3B.

Preferably, the guide 11 is associated with (fixed to or mounted on) the movable frame 9.

Preferably, the sealing unit 2 comprises a pair of guides (11A,11B) to guide the movement of the first and second sealing elements 3A and 3B relative to each other.

It should be noted that the guides (11A,11B) are mounted on (fixed to) the movable frame 9.

More specifically, the first sealing element 3A and the second sealing element 3B are slidably associated with the guides (11A,11B).

In the embodiment illustrated in the accompanying drawings, the first member EB1 of the articulated arm BB of the second movement means 6 is connected to the second motor 7 to be carried in rotation and the second member EB2 of the second movement means 6 is connected (hinged) to a rocker 12 (forming part of the second movement means 6).

More specifically, the second member EB2 of the second movement means 6 is connected (hinged) to the rocker 12 at a position different from the center of rotation XA of the rocker 12.

More specifically, it should be noted that the first member EB1 of the articulated arm BB of the second movement means 6 is fixed to a shaft which is connected to the second motor 7, to be carried in rotation by the second motor 7.

The second member EB2 of the second movement means 6, on the other hand, is connected (hinged) to the rocker 12.

More specifically, it should in effect be noted that in the embodiment illustrated, the second movement means 6 comprise a rocker 12 mounted movably (rotatably) on the movable frame 9 and connected to the second member EB2 of the articulated arm BB of the second movement means 6 to be driven in rotation relative to the frame 9.

It should be noted that the rocker 12 is hinged to the movable frame 9 to rotate about a pivot point XA.

Preferably, the rocker 12 is coupled (indirectly) to at least one of the sealing elements (3A,3B) (at a position other than the pivot point XA).

Still more preferably, the rocker 12 is coupled (indirectly) to both of the sealing elements (3A,3B). More specifically, the first and second sealing elements (3A,3B) are coupled (indirectly) to the rocker 12 on opposite sides of the pivot point XA.

In the embodiment illustrated, the second movement means 6 also comprise a first rod 13 which is operatively coupled to the first sealing element 3A and to the rocker 12 to move the first sealing element 3A when the rocker 12 is carried in rotation.

More generally speaking, the first rod 13 constitutes means for coupling the first sealing element 3A to the rocker 12.

The second movement means 6 also comprise a second rod 14 which is operatively coupled to the second sealing element 3B and to the rocker 12 to move the second sealing element 3B when the rocker 12 is carried in rotation.

More generally speaking, the second rod 14 constitutes means for coupling the second sealing element 3B to the rocker 12.

Preferably, the machine 100 comprises a control and drive unit 19 configured to control and drive the motors (5,7).

Below, with reference to the embodiment illustrated in the accompanying drawings, is a description of the operation of the machine 100 from which the specific advantages of the invention may be inferred.

Figure 2:
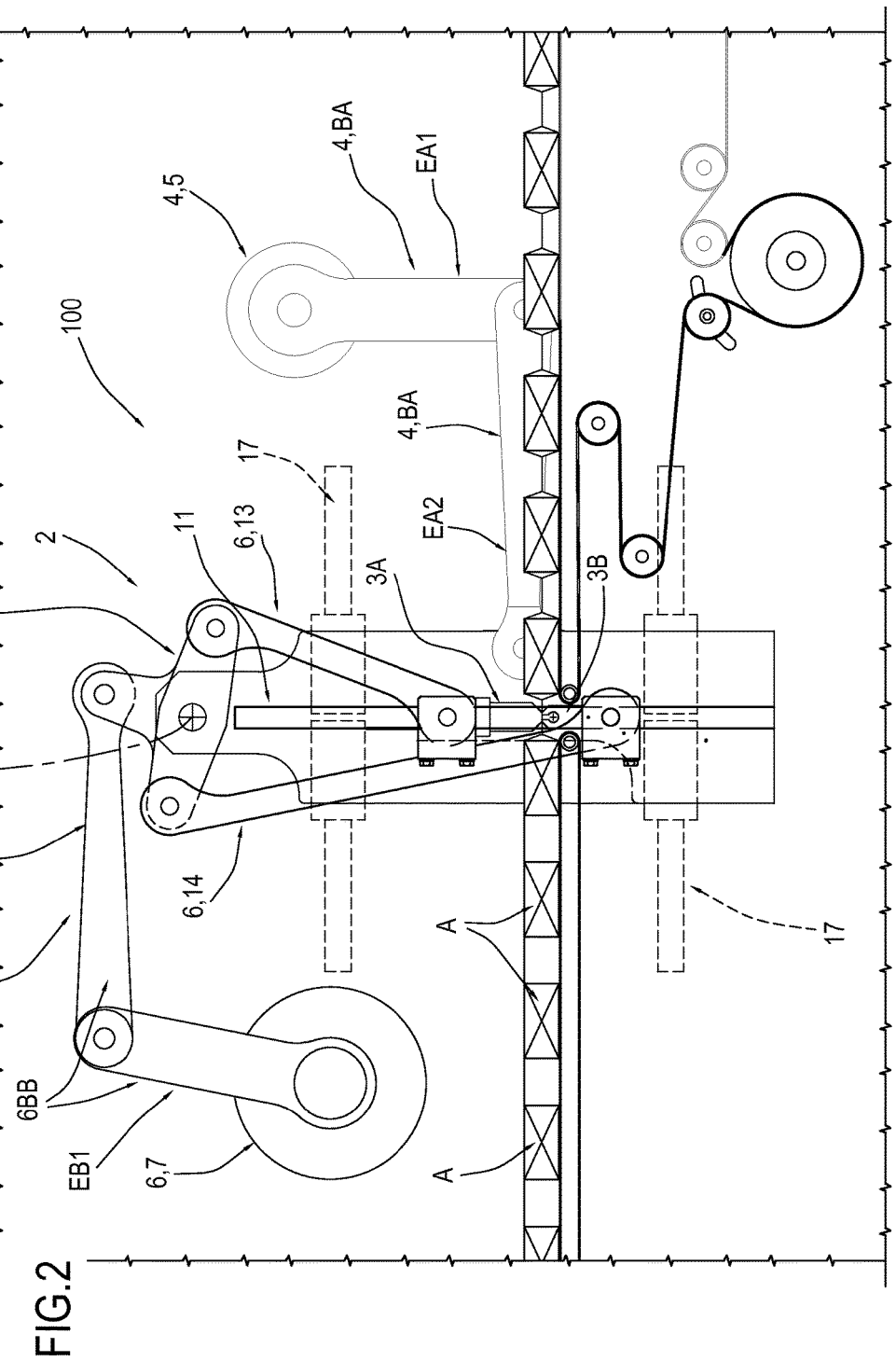
FIGS. 2 to 4 are side views illustrating respective details of the machine of the preceding figure in different configurations.
Figure 3:
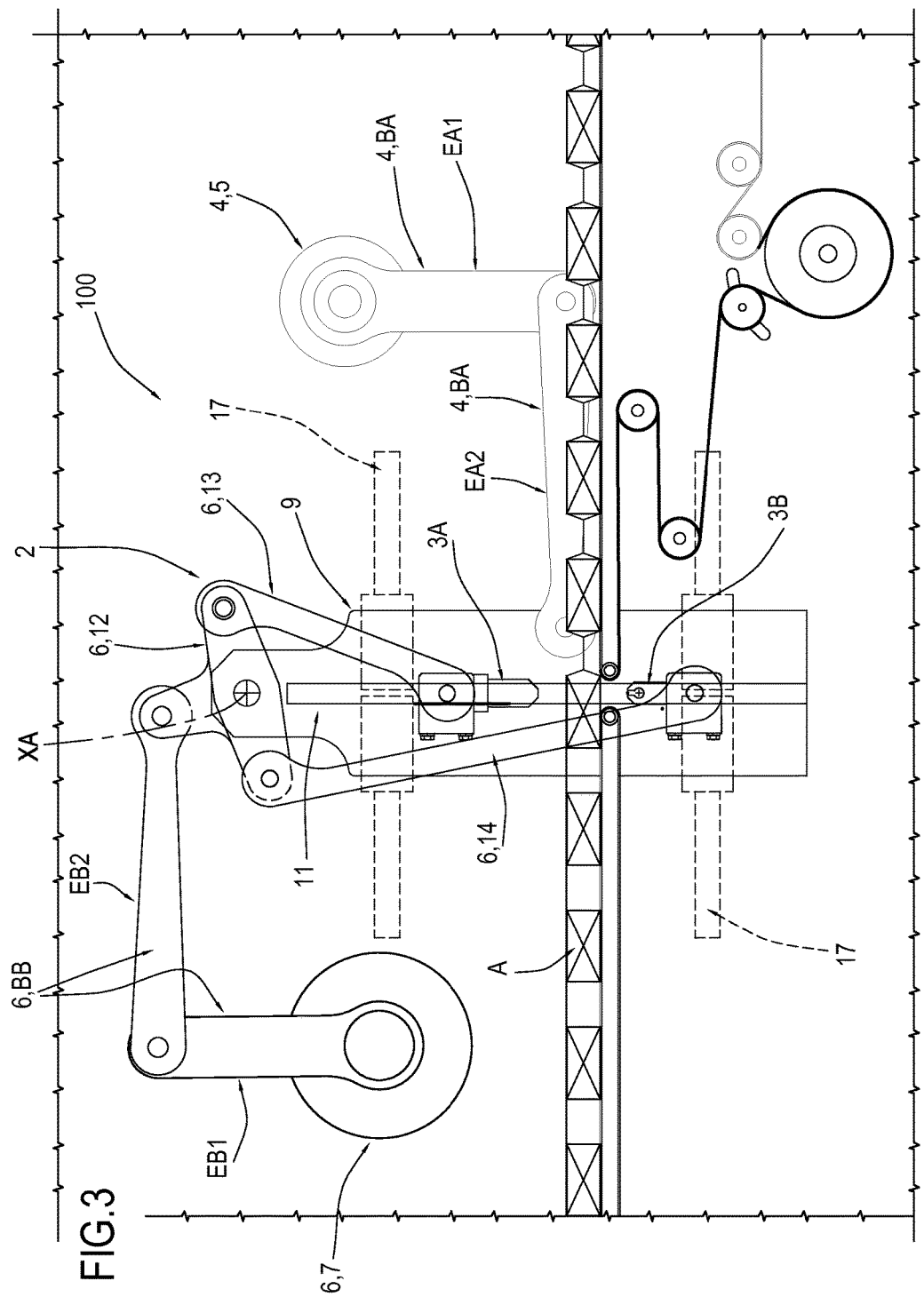
Figure 4:
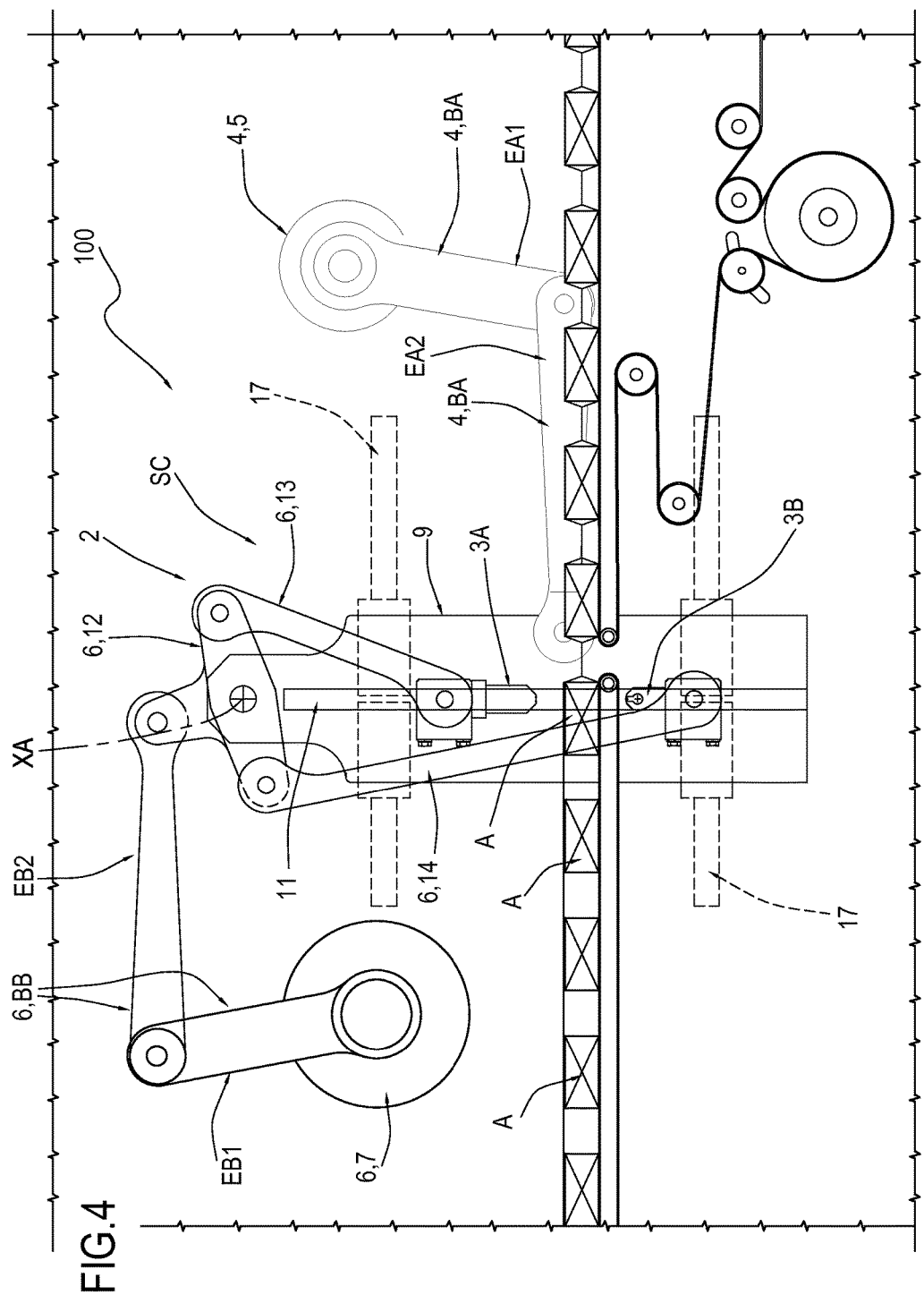
Figure 5:
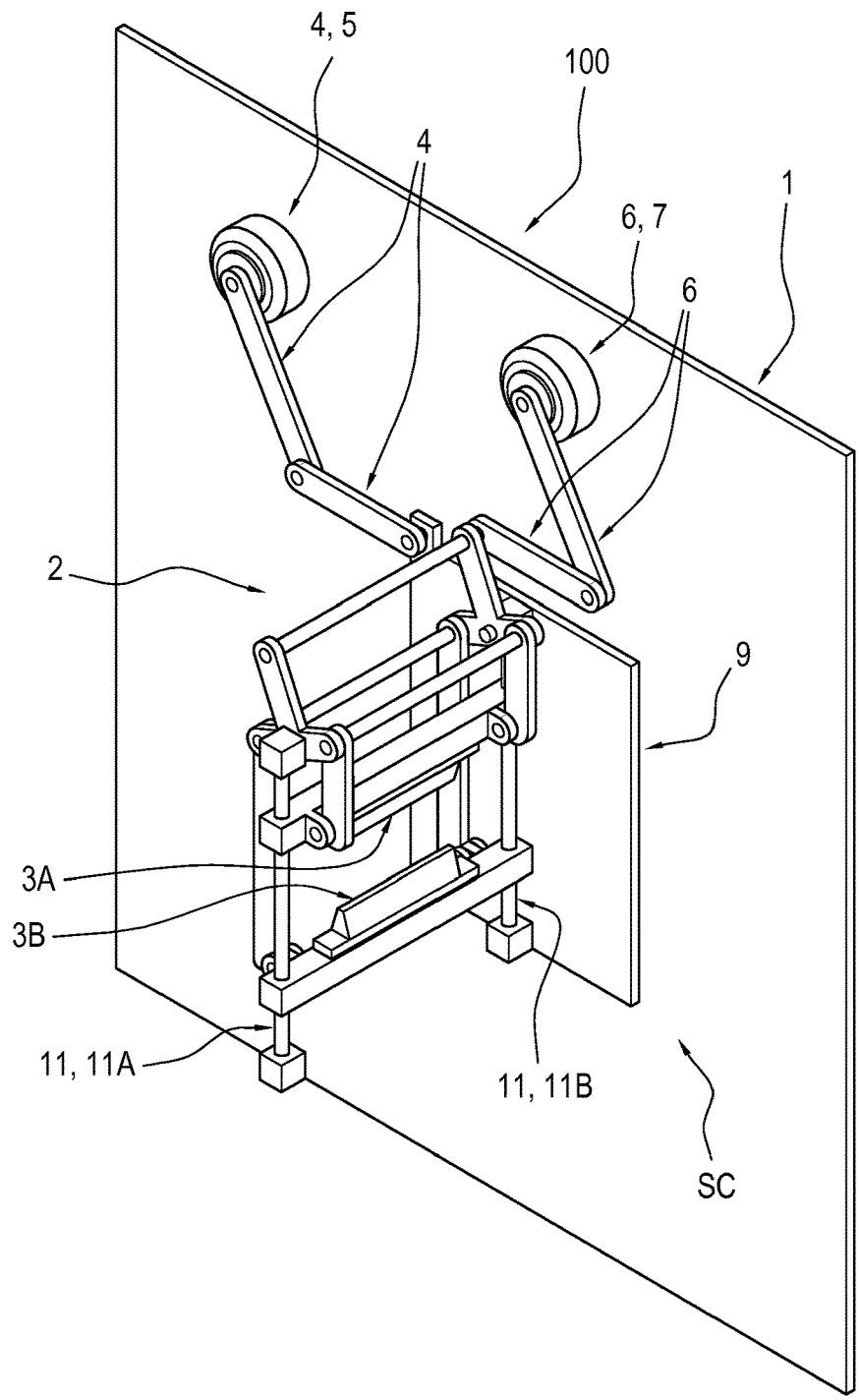
FIG. 5 is a schematic perspective view of a variant embodiment of the machine of the invention.

It should be noted that FIGS. 2 to 4 show the sealing unit 2 and the components thereof in different configurations/positions in order to illustrate the movements of the sealing unit 2.

In order to package an article A, the article A is fed to the packaging station SC.

At the packaging station SC is the packaging film used to wrap the article A.

In order to make a package, the film must be thermosealed in such a way that the article A is enclosed within a suitably sealed portion of the film.

Thus, the sealing unit 2 is moved longitudinally in such a way that the sealing elements (3A,3B) are positioned at a predetermined longitudinal position of the film where thermosealing takes place.

To move the sealing unit 2 longitudinally, the control unit 19 of the machine 100 sets the first motor 5 in rotation.

Rotation of the first motor 5 causes the first and the second member EA1 and EA2 of the articulated arm BA of the first movement means 4 to be moved in the movement plane.

The second member EA2 transmits the motion to the movable frame 9 of the sealing unit 2 so as to move the movable frame 9 along the respective guide 17 and thereby position the sealing unit 2 at a predetermined longitudinal position relative to the article A being wrapped.

It should be noted therefore that this kinematic chain (motor 5, articulated arm BA, movable frame 9), is such that the sealing unit 2 can be moved along a predetermined axis (of feeding the articles A) in two different directions in a particularly quick and easy manner.

More specifically, rotation of the first motor 5 in a first direction of rotation causes the movable frame 9 to be moved along the predetermined axis of movement in a first direction, whilst rotation of the first motor 5 in a second direction of rotation (opposite to the first) causes the movable frame 9 to be moved along the predetermined axis of movement in a second direction (opposite to the first).

Thus, it may be noted that, advantageously, the first motor 5 is not integral with the sealing unit 2 because it is fixed to the frame 1.

Advantageously, therefore, the weight of the first motor 5 is not supported by the sealing unit 2 but is carried by the frame 1. The sealing unit 2 is thus very light and inertia extremely reduced.

In order to make the seal, the sealing elements (3A,3B) must be moved from the spaced-apart position to the close-together position where they act in conjunction to seal the film, when the movable frame 9 is located at a predetermined position relative to the article (it should be noted that, preferably, the close-together position is maintained for a predetermined stretch of the stroke of the movable frame so that the product is followed and the seal made along a predetermined longitudinal stretch).

It should be noted therefore that the control unit 19 of the machine 100 suitably drives the second motor 7 to move the sealing elements (3A,3B), in cooperation with the first motor 5, from the spaced-apart to the close-together position.

It should be noted therefore that the movement of the sealing elements (3A,3B) is produced by the combined movement of the first and second articulated arms (BA,BB).

Thus, the movement of the sealing elements (3A,3B) is performed as a result of driving the first motor 5 and the second motor 7, in combination, that is, according to a predetermined relation.

It should be noted that the combined movement of the articulated arms BB and BA causes simultaneous translation of the movable frame 9 and rotation of the rocker 12 about its pivot point XA.

Rotation of the rocker 12 causes movement of the rods 13 and 14, which are connected (hinged) to the first sealing element 3A and to the second sealing element 3B, respectively.

Thus, the movement of the rods 13 and 14 causes the sealing elements 3A and 3B to be driven along the respective guides (11A, 11B), from the spaced-apart position to the close-together position.

The sealing elements (3A,3B) come into contact with the film when they are at the close-together position, allowing the film to be sealed.

It should be noted therefore that this kinematic chain (motor 7, articulated arm BB, rocker 12, rods 13 and 14 and motor 5, articulated arm BA and movable frame 9) is such that the sealing elements (3A,3B) can be moved along a predetermined axis in two different directions (from the spaced-apart position to the close-together position) in a particularly quick and easy manner.

More specifically, thanks to the articulated arms BB and BA, the movement of the sealing elements (3A,3B) is particularly simple and can be reversed between the forward stroke (from the spaced-apart to the close-together position) and the return stroke (from the close-together to the spaced-apart position).

More specifically, in a preferred embodiment, the rotation of the second motor 7 in a first direction of rotation—in combination with the translation of the movable frame 9—is such that the sealing elements (3A,3B) can be moved from the spaced-apart to the close-together position, while the rotation of the second motor 7 in a second direction of rotation (opposite to the first)—in combination with the translation of the movable frame 9—is such that the sealing elements (3A,3B) can be moved from the close-together to the spaced-apart position.

It should be noted that, preferably, the motors 5 and 7 are moved in a first and a second direction of rotation during wrapping of an article (that is, they preferably reverse their direction of rotation during the wrapping of each article).

It should be noted that the machine 100 is, advantageously, a particularly simple machine. With reference to the advantages of the machine 100, attention is drawn to the following.

The machine 100 allows reaching high operating speeds (not attainable by prior art machines). In effect, the inertias involved are particularly low, thus allowing the forward and return strokes of both the movable frame 9 and the sealing elements (3A,3B) to be reversed very quickly.

The machine 100 also allows the longitudinal stroke of the movable frame 9 to be adjusted (along the product feed direction) very easily.

In effect, it is sufficient to differently adjust the movement of the motors 5 and 7 (in particular by varying the angular stroke of rotation of the motors 5 and 7 between the two end positions of the cycle) to vary the longitudinal stroke of the sealing unit 2, for each product to be sealed.

According to this aspect, it is possible to seal different articles extremely easily since the sealing elements (3A, 3B)—under equal conditions of article feed speed—can be kept in contact with the packaging film for the length of time most suitable for the article being wrapped.

It is also advantageously possible to adjust the sealing pressure because—under equal conditions of angular stroke of the motors—the motor torque can be adjusted so as to have, at the close-together position of the sealing elements (3A,3B), a predetermined sealing pressure (depending on the force exchanged between the sealing elements 3A and 3B).

Described below is another advantageous aspect, with reference to machine adjustment for packaging products of different thickness.

With reference in particular to a generic product, it should be stressed that sealing must occur with the sealing elements (3A,3B) positioned half way along the thickness of the article A (that is, at what is known as the "center line").

Figure 6:
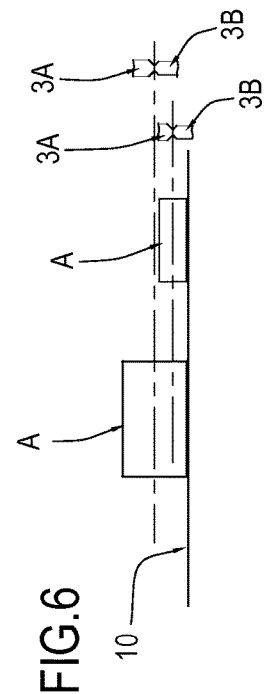
FIG. 6 diagrammatically represents an adjustment of the machine of the preceding figures with products of different thickness.

In this regard, it should be noted that FIG. 6 illustrates sealing of two products differing in thickness (height) and whose center line is thus located at a different level relative to the product feed line 10, that is, relative to the frame 1 of the machine 100.

Thus, with reference to this aspect, the machine 100 comprises a mounting member 15 which is connected movably to the frame 1 of the machine 100 to be adjusted at least in height.

It should be noted that the mounting member 15 allows adjusting in height the position of the sealing unit 2, that is, of the movable frame 9 relative to the frame 1.

More specifically, the mounting member 15 allows adjusting in height the position of the sealing unit 2 (that is, of the movable frame 9) and of the respective sealing elements 3A,3B relative to the article feed line 10.

More specifically, the mounting member 15 preferably supports:

the sealing unit 2;
the sealing elements (3A,3B);
the first movement means 4;
the first motor 5;
the second movement means 6;
the second motor 7.

More generally speaking, the mounting member 15 is connected movably to the frame 1 to be adjusted at least in height and supports at least the two sealing elements (3A, 3B), in such a way as to adjust the position of the two sealing elements (3A,3B) in height in the close-together position to seal products of different thickness.

It should be noted that the vertical movement of the mounting member 15 is such that—under equal conditions of angular strokes of the motors (5,7) between the end positions of each cycle—the level at which the sealing elements (3A,3B) are located when they are at the close-together position can be adjusted—relative to the feed line 10.

Thus, the sealing elements (3A,3B) at the close-together position can be located at the center line of the product in order to correctly seal the product.

It should be noted that according to this aspect, the machine can be adapted to packaging products of different thickness in a particularly quick and easy manner, without requiring particularly complicated adaptations.

In effect, the above adjustment is accomplished by simply adjusting the height of the mounting member 15.

Also, advantageously, according to another aspect, the machine 100 may allow packaging of products at different spacings (distances) from each other.

More specifically, according to this aspect, the machine comprises a sensor 18, located upstream of (or at) the packaging station SC to detect an article A in transit.

The sensor 18 transmits a signal—representing the transit of an article—to the control unit 19.

It should be noted that according to this aspect, the control unit 19 drives the motors (5,7) as a function of the signal representing the transit of an article received from the sensor 18, so that the sealing unit 2 can seal the articles whatever the spacing between them.

In effect, the first and second motors (5,7) are driven in such a way as to move the movable frame 9 and the respective sealing elements (3A,3B) in the required manner as a function of the detected spacing between the incoming articles A.

Thus, it is not necessary to set up the machine 100 for differently spaced articles because the machine 100 adapts automatically to packaging flows of articles at different spacings.

More generally speaking, the motion produced thanks to the articulated arms BA and BB is a particularly simple motion.

Furthermore, the fact that the motors 5 and 7 are not mounted on the movable frame 9 means that the sealing unit is particularly light.

The machine 100 allows significantly reducing the inertia of the sealing unit 2, making it possible to obtain a particularly effective longitudinal movement of the sealing unit 2 and vertical movement of the sealing elements (3A,3B).

According to the invention there is also provided a method for packaging articles A, comprising he steps of:
  feeding a film used for wrapping the articles A at a packaging station SC;
  conveying the articles A to the packaging station SC;
  providing a frame 1 and a sealing unit 2 located in the packaging station SC and movable relative to the frame 1 along at least one predetermined feed direction;
  providing at least two sealing elements (3A,3B) carried by the sealing unit 2 and movable relative to each other between a spaced-apart position and a close-together position where they cooperate to seal the film interposed between them;

The method according to the invention also comprises the following steps:
  providing at least one articulated arm (BA,BB);
  connecting the at least one articulated arm (BA,BB) to the sealing unit 2 or to the two sealing elements (3A,3B);
  driving the first motor 5 and the second motor 7 in phase relationship so as to move the two sealing elements (3A,3B) relative to each other and relative to the frame 1 according to a predetermined law of motion.

According to one aspect, the step of connecting the at least one articulated arm (BA,BB) comprises a step of connecting the articulated arm BB to the two sealing elements (3A,3B).

According to another aspect, the step of connecting the at least one articulated arm (BA,BB) comprises a step of connecting the articulated arm (BA,BB) to the sealing unit 2.

In one embodiment of the method, the step of providing at least one articulated arm (BA,BB) comprises the steps of:
  providing a first articulated arm BA, comprising a first member EA1 and a second member EA2 which are movable relative to each other;
  providing a second articulated arm BB, comprising a first member EB1 and a second member EB2 which are movable relative to each other, the step of connecting the at least one articulated arm (BA,BB) comprising a step of connecting the first articulated arm BA to the sealing unit 2 and the second articulated arm BB to the sealing elements (3A,3B).

According to yet another aspect, the method comprises a step of moving relative to each other the first member (EA1,EB1) and the second member (EA2,EB2) of the articulated arm (BA,BB) of the first and second movement means (4,6), this movement comprising a rotation of one first member (EA1,EB1) and one second member (EA2, EB2) relative to the frame 1.

Preferably, the step of moving in rotation one first member (EA1,EB1) and one second member (EA2,EB2) relative to the frame 1 comprises a step of cyclically rotating in one direction of rotation and in the other the one first member (EA1,EB1) and the one second member (EA2,EB2) relative to the frame 1.

Advantageously, according to the method, it is possible to move in a particularly fast and efficient manner the sealing unit 2 and/or the sealing elements (3A,3B), so that packaging is particularly effective and fast.

Furthermore, the method described above allows reaching particularly high operating speeds.

What is claimed is:

1. A machine for packaging articles comprising:
   a fixed frame;
   a feeding device for feeding a film to a packaging station, where the film is used to wrap the articles,
   a conveyor line by which the articles are directed to the packaging station;
   a sealing unit, located in the packaging station, movable relative to the fixed frame and also comprising two sealing elements movable relative to each other between a spaced-apart position and a close-together position where the two sealing elements cooperate to seal the film interposed between the two sealing elements;
   a first movement device for moving the sealing unit and comprising a first motor fixed to the fixed frame;
   a second movement device for moving the sealing unit and comprising a second motor fixed to the fixed frame, the second motor being operatively coupled to at least one of the two sealing elements,
   wherein the first movement device comprises a first articulated arm and the second movement device comprises a second articulated arm;
   a control unit operatively connected to the first motor and to the second motor in order to drive the first motor and second motor in a predetermined relationship to move the two sealing elements relative to each other and relative to the fixed frame;
   wherein the sealing unit comprises a movable frame which is movable, relative to the fixed frame, along a feed direction of the articles and which carries the two sealing elements;
   wherein the second movement device comprises a rocker hinged to the movable frame to rotate with respect to the movable frame about a pivot point,
   wherein the second articulated arm comprises a first member and a second member which are movable relative to each other, the first member being connected to the second motor to be carried in rotation and the second member being hinged to the rocker at a position different from the pivot point, so that the rocker is carried in rotation relative to the movable frame and about the pivot point,
   the rocker being coupled to at least one of the two sealing elements in order to move the two sealing elements from the spaced-apart position to the close-together position and vice versa,
   wherein the second movement device comprises a first rod which is operatively coupled to a first sealing element of the two sealing elements and to the rocker to move the first sealing element when the rocker is carried in rotation about the pivot point, and a second rod which is operatively coupled to a second sealing element of the two sealing elements and to the rocker to move the second sealing element when the rocker is carried in rotation about the pivot point;

wherein the second movement device comprises a guide associated with the movable frame to guide the movement of the first and second sealing elements relative to each other;

wherein the first motor is driven in a first rotation direction to move the movable frame in a first direction along a predetermined axis of movement parallel to the feed direction, and the first motor is driven in a second rotation direction, opposite to the first rotation direction, to move the movable frame along the predetermined axis of movement in a second direction opposite to the first direction; and wherein the second motor is driven in a third rotation direction to move the sealing elements from the spaced-apart position to the close-together position, and the second motor is driven in a fourth rotation direction to move the sealing elements from the close-together position to the spaced-apart position;

wherein the first motor is an electric motor, having a rotatable first shaft and the second motor is an electric motor having a rotatable second shaft;

wherein the first articulated arm comprises a first member and a second member of fixed length hinged to each other, the first member of the first articulated arm being fixedly connected to the first shaft and the second member of the first articulated arm being rotatably attached to the movable frame;

wherein the first member and the second member of the second articulated arm are of fixed length and the first member of the second articulated arm is fixedly connected to the second shaft.

2. The machine according to claim 1, comprising a mounting member which is connected movably to the fixed frame to be adjusted at least in height and which supports the two sealing elements, in such a way as to adjust the position of the two sealing elements in height in the close-together position to seal products of different thickness.

3. The machine according to claim 1, wherein the first articulated arm comprises a first member and a second member which are movable relative to each other to move the sealing unit along a feed direction of the articles.

4. The machine according to claim 3, wherein the first member of the first articulated arm is connected to the first motor to be carried in rotation and the second member of the first articulated arm is connected to the movable frame.

5. The machine according to claim 1, comprising at least one guide for the movable frame.

6. The machine according to claim 1, wherein the rocker is connected to both of the two sealing elements.

7. The machine according to claim 6, wherein the two sealing elements are connected to the rocker on opposite sides of the pivot point.

8. A method for packaging articles comprising:
feeding a film used for wrapping the articles at a packaging station;
conveying the articles to the packaging station;
providing a fixed frame;
providing a sealing unit located in the packaging station and movable relative to the fixed frame along at least one predetermined feed direction of the articles to be packaged;
providing two sealing elements carried by the sealing unit and movable relative to each other between a spaced-apart position and a close-together position where the two sealing elements cooperate to seal the film interposed between the two sealing elements;
providing a movable frame which is movable, relative to the fixed frame, along a feed direction of the articles and which carries the two sealing elements;
providing a first articulated arm;
providing a second articulated arm which comprises a first member and a second member which are movable relative to each other;
providing a first motor fixed to the fixed frame and a second motor fixed to the fixed frame;
arranging the first motor to be connected to the first articulated arm;
arranging the first articulated arm to be connected to the sealing unit;
arranging the second motor to be connected to the first member of the second articulated arm so that the first member of the second articulated arm is carried in rotation by the second motor;
providing a rocker hinged to the movable frame to rotate with respect to the movable frame about a pivot point;
arranging the rocker to be hinged to the second member of the second articulated arm so that the rocker is carried in rotation relative to the movable frame and about the pivot point, and in such a way that the second member of the second articulated arm is hinged to the rocker at a position different from the pivot point;
arranging the rocker to be coupled to a first sealing element of the two sealing elements in order to move the sealing elements from the spaced-apart position to the close-together position and vice versa;
providing a first rod which is operatively coupled to the first sealing element and to the rocker to move the first sealing element when the rocker is carried in rotation about the pivot point;
providing a second rod which is operatively coupled to a second sealing element of the two sealing elements and to the rocker to move the second sealing element when the rocker is carried in rotation about the pivot point;
providing a guide associated to the movable frame to guide the movement of the first and second sealing elements relative to each other;
driving the first motor and the second motor in a predetermined phase relationship so as to move the first and second sealing elements relative to each other and relative to the fixed frame;
driving the first motor in a first rotation direction to move the movable frame in a first direction along a predetermined axis of movement parallel to the feed direction, and driving the first motor in a second rotation direction, opposite to the first rotation direction, to move the movable frame along the predetermined axis of movement in a second direction opposite to the first direction; and
driving the second motor in a third rotation direction to move the sealing elements from the spaced-apart position to the close-together position, and driving the second motor in a fourth rotation direction to move the sealing elements from the close-together position to the spaced-apart position;
providing that the first motor is an electric motor, having a rotatable first shaft and the second motor is an electric motor having a rotatable second shaft;
providing that the first articulated arm comprises a first member and a second member of fixed length hinged to each other, the first member of the first articulated arm being fixedly connected to the first shaft and the second member of the first articulated arm being rotatably attached to the movable frame;
providing that the first member and the second member of the second articulated arm are of fixed length and the first member of the second articulated arm is fixedly connected to the second shaft.

\* \* \* \* \*